3,129,094
METHOD OF PRODUCING A SLAG HAVING THE LOW MELTING POINT IN THE MANUFACTURE OF METALLIC MAGNESIUM BY REDUCTION OF MAGNESIA WITH FERROSILICON
Eiji Munekata and Akira Suzuki, Tokyo, Japan, assignors to Asahi Kasei Kogyo Kabushiki Kaisha, Osaka, Japan, a corporation of Japan
No Drawing. Filed Apr. 21, 1960, Ser. No. 23,616
Claims priority, application Japan May 27, 1959
1 Claim. (Cl. 75—67)

This invention relates to an improvement in the production of magnesium and particularly it relates to a method of producing a slag having a low melting point in the manufacture of metallic magnesium by reduction of magnesia with ferro-silicon.

Various attempts have been made to manufacture metallic magnesium by direct reduction of magnesia or calcined dolomite, some of which have been patented. Commercially the so-called Pidgeon process is prevalent wherein the calcined dolomite is reduced with ferro-silicon.

The Beaudean process of Pechiney Company in France, one type of the Pidgeon process, is characterized in that calcined dolomite is reduced with ferro-silicon by heat caused by resistance of an electrode in an electric furnace, and that alumina or alumina-containing material is added so as to maintain the slag produced from the reaction in a liquid state. The electric conductivity of the slag serves to maintain it in a liquid state by the Joule effect inside the molten bath and to supply the heat required for the endothermic reaction for reduction.

The reducing reaction is represented by the following chemical equation:

$$2CaO \cdot MgO + (Fe)Si + nAl_2O_3 \rightarrow SiO_2 \cdot nAl_2O_3 \cdot 2CaO + 2Mg \quad (1)$$

The product left after the reaction is silico-aluminate. Since the operation temperature of the furnace is maintained at 1500° C. or so, which is the melting point of the above substance, a molten state is preserved inside the furnace. Moreover, as the molten bath has an electric conductivity it can be used as an electric resistance body.

The reducing reaction occurs in a solid phase for one part and in a liquid phase for the other part. The operation temperature of the furnace (about 1500° C.) and the reduced pressure inside the furnace (about 8 mm. Hg) permit to bring about the two phase reaction.

The reaction proceeds predominantly in a solid phase when the material is charged into the furnace in a powdered form. On the contrary, the reaction proceeds predominantly in a liquid phase when the material is charged in a granular form. In the latter case the reaction consists of two stages. In the first stage the calcined dolomite and the alumina dissolve in the slag, and in the second stage they begin to react with the ferro-silicon. The equilibrium temperature may be determined by the following equation:

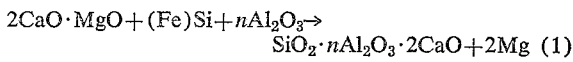

$$\log P = \frac{-Q}{4.573T} + \frac{\Delta S}{4.573}$$

This, of course, depends upon the conditions of the reactants at the time of reaction and also upon the relative concentrations thereof. The addition of the alumina and the alumina-containing material takes an essential role in this stage. This is because, restricted by the composition of dolomite ($CaCO_3 \cdot MgCO_3$), the composition of the residual resulting from the reaction is $SiO_2 \cdot 2CaO$ (M.P. 2100° C.), which can not be molten at the operation temperature of the furnace, i.e., about 1500° C. On the other hand the amount of alumina required for reducing the melting point of the slag permits to decrease the equilibrium temperature to some extent by the generation heat of the silico-aluminate.

In a practical operation, in order to obtain a reaction efficiency very close to 90% (residual magnesia in the slag=approx. 3%) the following conditions are required in the slag.

(1) The molecular ratio $CaO/SiO_2$ should be 2 or more.
(2) The molecular ratio $Al_2O_3/SiO_2$ should be 0.3 or more.

The Beaudean process is a very attractive invention since it permits to maintain the slag in a molten state by the addition of the alumina or alumina-containing material whereby the unit of the manufacturing apparatus can be enlarged and the production cost decreased. However, as set forth hereinbefore, it is subjected to limitation by the composition of the dolomite feed on which the composition of the slag also depends. That is, when it is desired to decrease the melting point of the composition $SiO_2 \cdot 2CaO$ by the addition of $Al_2O_3$ thereto, it is clearly shown in the equilibrium diagram of $SiO_2$—$Al_2O_3$—$CaO$ that the melting point becomes close to 1500° C. for the approximate composition of $SiO_2 \cdot 2CaO \cdot Al_2O_3$ or Gehlenite. Consequently, it can be considered that the value of $n$ should be close to 1 for practical use though it is defined as 0.3 or more. This is evidenced by a pamphlet of Pechiney Company in which is shown that 0.75 ton of alumina is required per one ton of metallic magnesium. Calculating back from this value according to Equation 1 the value of $n$ is 0.6 which substantially justifies the above judgment.

It is the primary disadvantage of the Beaudean process that a large quantity of such expensive alumina must be used. Even when the alumina-containing material is used in a mix the disadvantage of high cost can hardly be avoided since the material of high alumina content must be used in view of the addition in large quantities.

As for the operating temperature of the furnace, it should preferably be low from the view points of operation, heat economy and the life of the furnace. In the Beaudean process, it is impossible to effect the operation at lower temperatures as one is restricted by the melting temperature of the slag, 1500° C. This is the second disadvantage of the Beaudean process.

As for the fluidity, viscosity, etc. of the slag, they can be determined usually by the evaluation of such three points as the initial deforming temperature, melting temperature, and fluidizing temperature, said melting temperature not showing a distinct point practically. In case that these points are close together it means that the gradient of the vsicosity-temperature curve is sharp and that the viscosity of the slag will rapidly increase at a slight decrease of the temperature thereof. Generally, the gradient of the viscosity-temperature curve will be sharp when the CaO component in the slag increases, as shown by P. Barett, Chemistry of Coal Utilization, 1947, p. 550. Thus, difficulties may be encountered in operation according to the Beaudean process as the requirement of $CaO/SiO_2$ being 2 or more, causes an increase in the viscosity of the slag, which is a drawback when tapping the slag.

The above drawbacks are avoided by an improvement in accordance with the present invention, of the process of producing continuously magnesium by feeding a mixture of magnesia and ferro-silicon under reduced pressure at a temperature of 1300° to 1600° C. to a magnesia-reducing zone, reducing the magnesia therein, separating magnesium in the form of vapor, condensing and recovering magnesium, with formation of a slag which is being tapped out, which improvement comprises adding to the magnesia-reducing zone CaO- and Al₂O₃-containing materials, respectively to form a molten slag having a composition of SiO₂ about 62%, Al₂O₃ about 15%, and CaO about 23%.

As CaO-containing materials there have been used in particular quick lime and calcined carbide slag. Alumina or calcined clay has been used as the Al₂O-containing material.

The present invention provides, for the first time, a composition of SiO₂—Al₂O₃—CaO which eliminates the disadvantage of limitations resulting from the use of dolomite as the feed material in the Beaudean process. This composition (62% by weight of SiO₂, 23% by weight of CaO and 15% by weight of Al₂O₃) is referred to hereinafter as slag A, which has a melting point of 1165° C. The fluidity of slag A can be kept high even when the operating temperature of the furnace is maintained at between 1300° C. and 1400° C.

It has so far been known in the practical operation of the furnace that the operation can be most easily effected when 10–18%, especially about 15%, of Al₂O₃ is contained in the slag composition, and that the slag composition (CaO/SiO₂=0.5–0.7) having the low melting point is utilized in the smelting of charcoal pig iron as described by Kamekichi Wada, Practical Manufacture of Pig Iron, 149. From this article it can be concluded that the slag A is the most desirable one in view of the teachings so far obtained from the actual experiences. Moreover, the content of CaO is about one fourth of that of the Beaudean process as shown by the molecular ratio CaO/SiO₂=0.55. Consequently, the above third disadvantage can be eliminated.

The molecular ratio Al₂O₃/SiO₂ in the slag A is 0.19 by calculation, which means that the amount of alumina required may eventually be small in respect of that of ferro-silicon used for the reaction. Therefore, it can be considered that the dehydrated and calcined minerals of clay system will suffice without the use of the alumina-containing material of high purity, which permits the use of very cheap clay.

The chemical equation in which the slag A is produced on the reducing reaction of magnesia and ferro-silicon may be obtained as follows:

|  | Weight Ratio, percent | Molecular Weight | Number of Molecules |
|---|---|---|---|
| SiO₂ | 62 | 60 | 1.0 |
| Al₂O₃ | 15 | 102 | 0.14 |
| CaO | 23 | 56 | 0.4 |

Thus, the molecular formula of the slag A is $$SiO_2 \cdot 0.14Al_2O_3 \cdot 0.4CaO$$

When the calcined clay is used as the alumina-containing material the weight ratio of the clay composition is as follows:

Composition of clay—     Weight ratio, percent
Al₂O₃ _____ 38.0
SiO₂ _____ 46.5
H₂O and others _____ 15.5

From this, the molecular ratio Al₂O₃/SiO₂≑½.
The chemical equation to be obtained is:

$$2xMgO + x(Fe)Si + yCaO + Z(Al_2O_3 \cdot 2SiO_2)$$
$$\rightarrow SiO_2 \cdot 014Al_2O_3 \cdot 0.4CaO + 2xMg \quad (2)$$

x mol—Number of molecules of (Fe)Si
y mol—Number of molecules of CaO
z mol—Number of molecules of Al₂O₃·2SiO₂

Then:
y=0.4
z=0.14
x+2Z=1
x=1−2Z=1−2x0.14=0.72

Accordingly, the Equation 2 is:

$$1.4MgO + 0.72(Fe)Si + 0.40CaO$$
$$+ 0.14(Al_2O_3 \cdot 2SiO_2) \rightarrow SiO_2 \cdot 0.14Al_2O_3 \cdot 0.4CaO$$
$$+ 1.4Mg \quad (2')$$

Comparison between the Equation 1 and the Equation 2' shows:

|  | (1) | (2') |
|---|---|---|
| Molecular ratio Al₂O₃/SiO₂ | 0.3 or more | 0.14 |
| Molecular ratio CaO/SiO₂ | 2 or more | 0.4 |
| Melting point of slag | 1,500° C | 1,160° C |

From the foregoing description, it is obvious that the disadvantages due to the dolomite composition can be eliminated when magnesia is used as the feed material.

Originally, the principal source of magnesia was magnesite ore, whereby the condition of location of plants was often limited by the manner in which the magnesite ore is distributed. At the present time, however, the method of producing magnesium hydroxide from the sea water by lime or carbide slag has commercially been used with success and low cost sea water magnesia can be readily obtained. From this standpoint, a process of producing metallic magnesium in which slag A is produced from the magnesia as the feed material is a highly valuable invention.

*Example*

The relation between the electrical resistance and the temperature in respect of the slag from the Beaudean process and the slag A of the present invention is shown in the following table. As a result of it, the slag A has also an electrical conductivity under the molten conditions and can be satisfactorily used as an electric resistance body in the reduction furnace.

| Temperature (° C.) | Electrical Resistance, Ω cm.³ | |
|---|---|---|
|  | Slag of Beaudean Process | Slag A |
| Normal Temp. | 70,000 | 70,000 |
| 500 | 70,000 | 70,000 |
| 1,000 | 67,000 | 67,000 |
| 1,100 | 66,000 | 63,000 |
| 1,200 | 48,000 | 40,000 |
| 1,250 | 38,000 | 200 |
| 1,300 | 11,000 | 100 |
| 1,350 | 1,800 | 85 |
| 1,400 | 800 | 60 |
| 1,500 | 50 |  |
| 1,600 | 4 |  |

After the experiments for this measurement has been completed the slag is caused to cool gradually and the relation between the fluidity temperature and the melting temperature is determined qualitatively. The result is that the slag of the Beaudean process losses its temperature from 1600° C. and almost solidifies at 1550° C. while the slag A becomes gradually viscous from 1400° C. down to about 1250° C., there being no rapid solidification. From the difference in nature between these slags, the handling of the slag A is very easy in a practical operation. The specific gravity is 3.0 or so in respect of these two slags, there being no great difference. Consequently both two slags can be operable in a similar way even when the specific gravity thereof has effect upon the furnace operation.

What is claimed is:

In the continuous production of magnesium by the reduction of a magnesium-containing raw-material with ferro-silicon in a reducing zone, evaporation of the reduced metallic magnesium from the reducing zone, condensation and recovery of the magnesium, and tapping of the formed slag, the improvement in combination therewith consisting essentially of (a) feeding into the reducing zone magnesia, ferrosilicon, a CaO-containing material selected from the group consisting of quick lime and calcined carbide, and an $Al_2O_3$-containing material selected from the group consisting of alumina and calcined clay, (b) heating the resulting mixture at a temperature of 1300° to 1400° C. under a pressure of about 8 mm. Hg, said CaO- and $Al_2O_3$-containing materials being added in such amounts that there is obtained a slag having a composition of about 62% $SiO_2$, about 15% $Al_2O_3$, and about 23% CaO, said slag being molten and electrically conductive at the aforecited temperature, and (c) maintaining said slag in the molten state within said temperature range by passing electric current therethrough, thereby utilizing the Joule effect produced due to the electrical conductivity in said slag at said temperature, corresponding to maximally about 100 $\Omega$-cm.$^3$ at 1300° C.

References Cited in the file of this patent

UNITED STATES PATENTS

| | | |
|---|---|---|
| 2,370,898 | Whiton et al. | Mar. 6, 1945 |
| 2,396,658 | Hybinette et al. | Mar. 19, 1946 |
| 2,582,120 | Hansgirg | Jan. 8, 1952 |
| 2,971,833 | Artru et al. | Feb. 14, 1961 |

OTHER REFERENCES

Gross: The Story of Magnesium, A.S.M., Cleveland, Ohio, 1949, pages 36–46 relied on.